No. 614,003. Patented Nov. 8, 1898.
J. JOHNSON.
BAND SAW.
(Application filed Feb. 21, 1898.)
(No Model.)
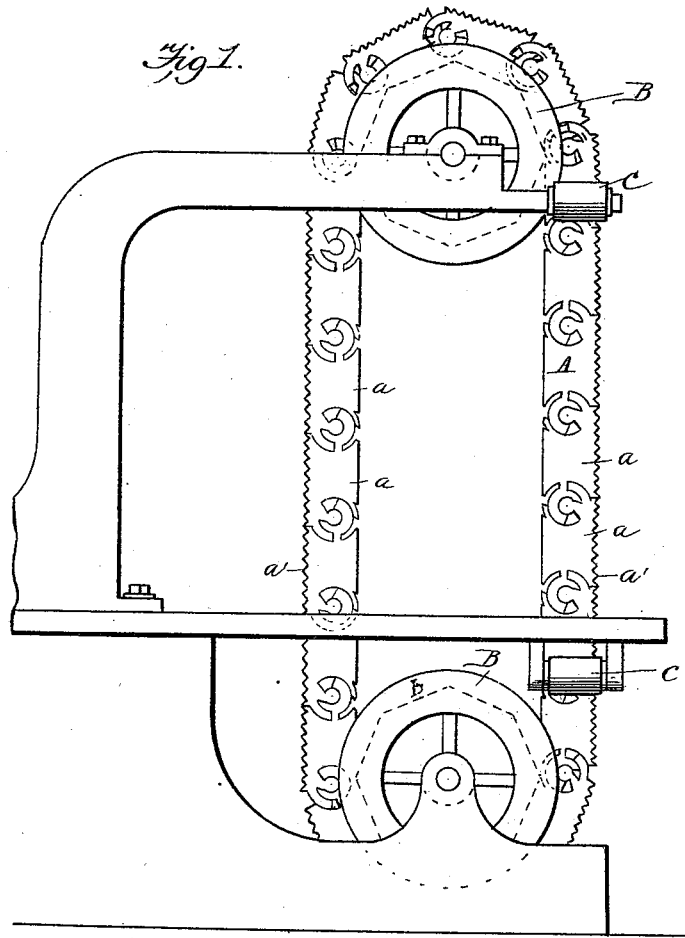
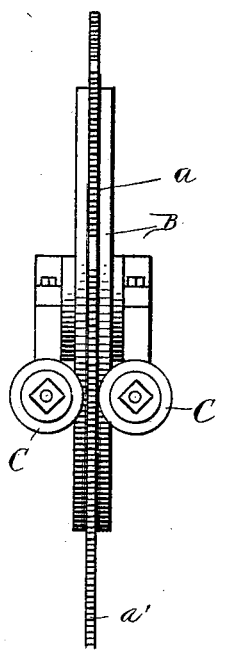
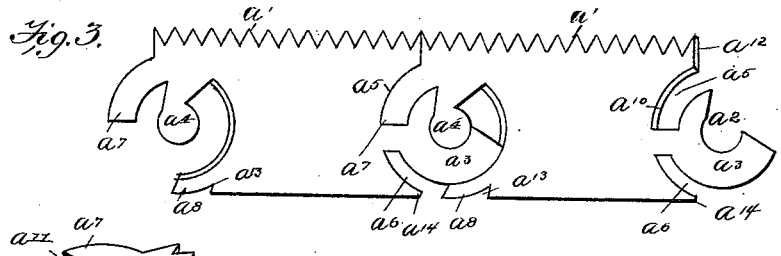
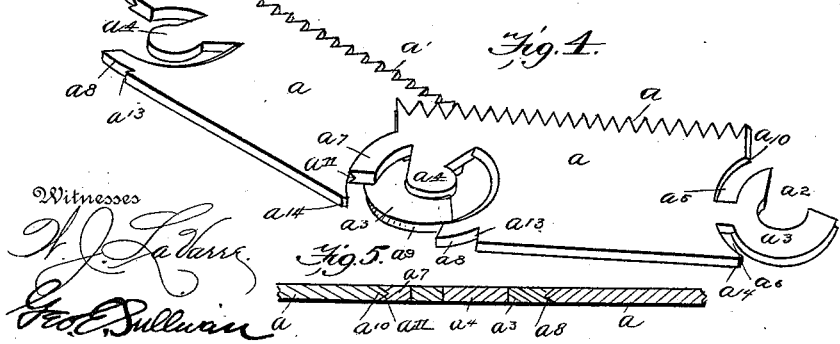

UNITED STATES PATENT OFFICE.

JOHN JOHNSON, OF TACOMA, WASHINGTON.

BAND-SAW.

SPECIFICATION forming part of Letters Patent No. 614,003, dated November 8, 1898.

Application filed February 21, 1898. Serial No. 671,132. (No model.)

*To all whom it may concern:*

Be it known that I, JOHN JOHNSON, a citizen of the United States, residing at Tacoma, in the county of Pierce and State of Washington, have invented certain new and useful Improvements in Band-Saws; and I do hereby declare the following to be a full, clear, and exact description of the invention, such as will enable others skilled in the art to which it appertains to make and use the same.

My invention relates to improvements in band-saws, and has for its object to produce a saw which will be capable of running upon its edge about suitable supporting and actuating pulleys.

It consists in providing a band-saw with a series of joints formed in the metal of the saw, the said joints being so arranged as to offer no obstruction to the passage of the saw through the material to be cut.

It also consists in building up a band-saw of a series of joining pieces connected together by suitable joints, the construction being such that any one of the joints may be removed and replaced by a new one in the case of injury to any one of the teeth of the saw.

It also consists in certain other novel constructions, combinations, and arrangements of parts, as will be hereinafter fully set forth and claimed.

In the accompanying drawings, Figure 1 represents a side elevation of my improved band-saw, showing the pulleys for supporting the same. Fig. 2 is a detail front view of a portion of the saw and one of the supporting-pulleys, showing the manner of guiding the saw to the groove in the said pulley. Fig. 3 represents an enlarged detail view showing one of the joints for connecting the sections of the saw. Fig. 4 represents two sections of the saw with the interposed joints separate and in position for placing one member of the joint within the other to secure them together. Fig. 5 is a detail sectional view through one of the joints, showing the fitting meeting edges of the parts.

A in the drawings represents a band-saw, B B pulleys for supporting the same, and C antifriction-rollers for guiding the band-saw into the grooves of the pulleys.

In constructing a band-saw which is adapted to run about its supporting-pulleys upon its edge instead of upon its side it is necessary to join it at intervals, so that it will be capable of bending at these points. It is also desirable to construct these joints so that they will not only be strong and capable of great endurance, but will not materially interfere with the passage of the saw through whatever substance is being cut. In carrying out these features I construct my improved band-saw of a number of sections, as $a\ a$, which are provided with one or any number of teeth upon its cutting edge, as at $a'\ a'$. These sections are provided with engaging members at their ends, which are adapted to fit into corresponding members of the next adjacent sections, so as to form a securing-joint between the same. At one end of each section a receiving socket or member, as $a^2$, is formed, which comprises an extended segmental portion, as $a^3$, provided with a central socket which is adapted to receive a corresponding central head or pivot portion, as $a^4$, formed upon the opposite end of the next section. The segmental portion $a^3$ is also separated for the most part from the body portion of its section $a$ by segmental sockets, as at $a^5\ a^6$. As already stated, a centering head portion, as $a^4$, is formed upon the opposite end of the next section, which is adapted to fit into the central socket of the segmental portion $a^3$. Segmental extensions, as $a^7\ a^8$, are also formed on the end of the next adjoining section, the section $a^7$ being adapted to fit in and work in the segmental socket $a^5$, while the extension $a^8$ is adapted to extend and work in the segmental socket $a^6$. The central segmental extension $a^3$ is provided on its outer periphery with a V-shaped groove, as $a^9$, which is adapted to receive a correspondingly V-shaped edge formed upon the segmental portion $a^8$. The segmental section $a^5$ is provided with a similar V-shaped projection, as $a^{10}$, which is adapted to fit into a V-shaped groove, as $a^{11}$, formed on the outer periphery of the segmental section $a^7$, the said groove $a^{11}$ being also extended to the front edge of the saw and adapted to receive a corresponding portion formed upon the end of the other section, as at $a^{12}$. It will be apparent that when these segmental portions are fitted together these grooved portions will hold the members of the joints against lateral movement with respect to each other and prevent them from becoming accidentally disengaged.

In order to permit of the sections bending to a sufficient angle for passing around the pulleys, the sections are cut away, as at $a^{13}$, to accommodate the projecting point formed on the opposite section, as at $a^{14}$. The saw runs upon pulleys B B, which are provided with peripheral grooves, as $b$, of sufficient width to receive the bending saw edgewise. The back of the sections $a$ of the saw fit against the faces formed in the bottom of the groove $b$, made of sufficient length to correspond with the length of the sections of the saw. As shown in the drawings, these faces are eight in number; but it is apparent that a greater or less number of faces might be used according to the size of the pulley or the length of the sections used in constructing the saw. It is preferable, however, to use a many-sided pulley, because it serves to make such a connection with the saw as to enable the pulleys to actuate it and prevent its slipping in cutting through material of any kind. To guard against any possible material movement at the joints of the sections of the saw when the saw is passing to the grooves of the pulleys B B, antifriction-rollers, as C C, are mounted in close proximity to the point where the saw passes to said pulleys. These rollers are placed sufficiently close together to form guides at these points to the sections of the saw.

In assembling the sections of the saw the central pivotal projection is fitted into the corresponding opposite section and the segmental projection $a^8$ is started in the groove formed on the outer periphery of the segmental extension $a^3$, as illustrated in Fig. 4 of the drawings. The sections are then turned until the projection $a^8$ has traveled into the segmental recess $a^6$ as far as it can go, when the projection $a^7$ will spring into place opposite the end of the socket $a^5$ in position to enter the same when the sections of the saw are brought into a straight line. It will be apparent that the sections of the saw can be readily disengaged by reversing this operation.

The pulleys B B may be mounted in any suitable framework and the sockets of the said pulleys may receive motion from any well-known power, as in common practice.

It will be evident from the above description that by forming the sections of the band-saw with the joints, as above described, these joints can be made of any desired strength, as they are not dependent upon any rivets or pivots of the ordinary type, which easily wear and soon get out of order. It will be seen that not only are these joints strong, but that they can be made so as to come within the ordinary thickness of metal used in making such kinds of saws, the said jonts being entirely flush with the surface of the metal, so as to offer no obstruction whatever in passing through the material being sawed. The sections may be provided with any style of teeth and one tooth may be made to a section or a greater number may be formed thereon, as may be required. Saws of this character may be used for cross-cut purposes or for ripping lumber longitudinally. This kind of saw has been found to be particularly well adapted for ripping logs and producing lumber of various kinds therefrom.

Having now described my invention, what I claim as new, and desire to secure by Letters Patent, is—

1. A band-saw comprising a series of sections carrying saw-teeth, each section being provided at one end with a centering projection and segmental extensions on said end partially surrounding said projection, and at the other end with a centering-socket and partially-surrounding segmental sockets corresponding to and adapted to receive the segmental projections on the other end of the section, the construction being such that one end of each section is adapted to engage the adjacent end of the next section for forming a pivotal joint whereby the saw is adapted to bend edgewise, substantially as described.

2. A band-saw comprising a series of sections having saw-teeth, each section being provided at one end with a centering projection and segmental extensions partially surrounding the said projection and having at the other end a centering-socket and partially-surrounding segmental sockets corresponding with and adapted to receive the said segmental extensions, and grooved portions formed on the meeting edges of the segmental portions for receiving corresponding portions formed on the opposite faces of the sections whereby a lateral movement is prevented between the parts, substantially as described.

3. A band-saw comprising a series of sections having saw-teeth, each section being provided at one end with a projection having a centering-head, the said centering-head having flat faces and segmental projections extending from the body of the section outwardly in each direction to partially surround the centering-head, one of said segmental projections having a beveled edge and the other having a grooved edge, the other end of each section being provided with a centering-socket having flat faces and partially-surrounding segmental grooves, one of said sockets having a grooved form in one of its faces, and the other socket having beveled edges formed upon one of its faces, the construction being such that the segmental grooves are adapted to receive the segmental sockets so as to lock the parts in place and prevent lateral movement, substantially as described.

4. A band-saw comprising a series of sections having teeth, each section being provided at one end with a centering projection and segmental extensions partially surrounding said projections and at the other end with a centering-socket and segmental sockets partially surrounding the same, the said sockets corresponding with and adapted to receive the segmental projections on the end of the adjoining section, grooved pulleys adapted to guide and actuate the said saw and guiding-pulleys adapted to direct the saw into the grooves of the actuating-pulleys, substantially as described.

In testimony whereof I hereunto affix my signature in presence of two witnesses.

JOHN JOHNSON.

Witnesses:
FRANK J. MILLER,
A. J. HOLMES.